No. 641,129. Patented Jan. 9, 1900.
J. E. LUCE & F. D. SEARS.
CABLE SAW.
(Application filed Aug. 7, 1899.)
(No Model.)
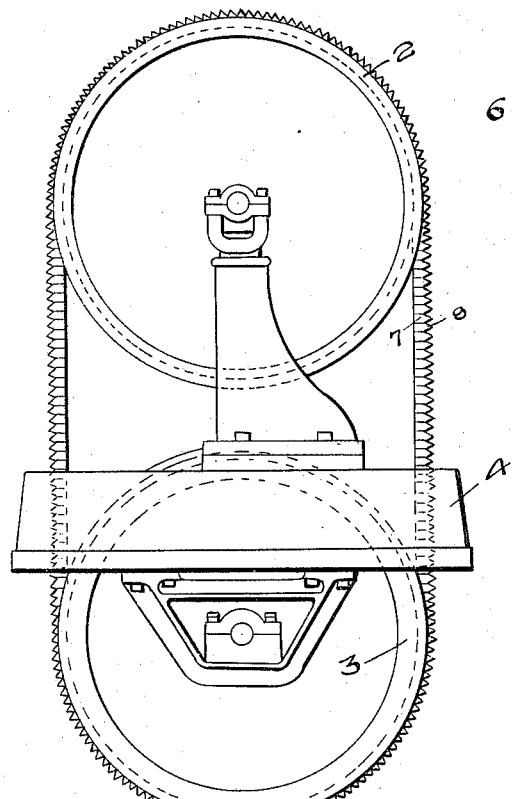
FIG. 1.
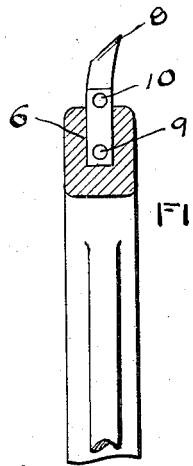
FIG. 2.
FIG. 5.
FIG. 3.
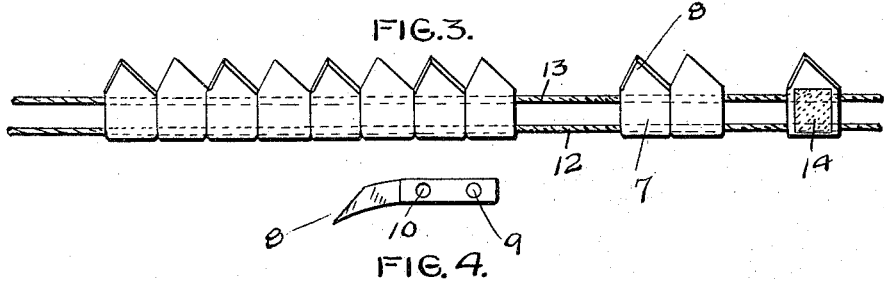
FIG. 4.
WITNESSES
E. G. Slade
A. F. Holmes
INVENTORS
JOHN E. LUCE
FREDERICK D. SEARS.
BY Paul F. Hawley
THEIR ATTORNEYS.

UNITED STATES PATENT OFFICE.

JOHN E. LUCE AND FREDERICK D. SEARS, OF MINNEAPOLIS, MINNESOTA.

CABLE-SAW.

SPECIFICATION forming part of Letters Patent No. 641,129, dated January 9, 1900.

Application filed August 7, 1899. Serial No. 726,353. (No model.)

*To all whom it may concern:*

Be it known that we, JOHN E. LUCE and FREDERICK D. SEARS, of Minneapolis, county of Hennepin, State of Minnesota, have invented certain new and useful Improvements in Cable-Saws, of which the following is a specification.

Our invention relates to cable-saws; and the objects we have in view are, first, to provide a cable-saw particularly adapted for cutting down trees, being operated by a suitable machine near the base of the tree; second, to provide a cable-saw that will be cheap to manufacture, easily kept in repair without any considerable expense, and of strong and durable construction.

The invention consists generally in providing a series of separable teeth and independent means for joining or connecting said teeth together to form a saw.

Further, the invention consists in an endless cable, belt, or chain of teeth and means for joining or securing the ends of said cable, belt, or chain together.

Further, the invention consists in a series of separable teeth having holes or openings extending from edge to edge and flexible cables, bands, chains, or rods passing through said holes or openings and whereon said teeth are strung and supported.

Further, the invention consists in various constructions and combinations, all as hereinafter described, and particularly pointed out in the claims.

In the accompanying drawings, forming part of this specification, Figure 1 is a side elevation of the upper and lower pulleys or wheels of a cable-saw mill with their supporting-frames, showing our improved saw in position upon the wheels. Fig. 2 is a sectional view of a portion of one of the wheels, showing the groove in its periphery and a section of a saw-tooth fitting therein. Fig. 3 is a plan view of a section of the saw. Fig. 4 is an edge view of one of the teeth; and Fig. 5 is a sectional view of one of the teeth, showing the manner of securing together the ends of the cable, band, or chain.

In the drawings, 2 and 3 represent, respectively, the upper and lower wheels or pulleys of a cable-saw mill, 4 the base or frame supporting the lower wheel, and 5 the bracket or standard whereon the upper wheel is mounted in suitable bearings. These wheels or pulleys are provided with annular grooves 6 in their peripheral surfaces to receive the inner edge of the saw, as shown in Fig. 2. The teeth of the saw are preferably stamped from sheet-steel, and each comprises a part 7, having a pointed end 8, forming the cutting portion of the tooth. The part 7 of each tooth is provided with holes 9 and 10, preferably near the inner end of the tooth and the base of the cutting portion, respectively, and extending transversely through the tooth from edge to edge and the holes in each tooth registering with the corresponding holes in the adjoining teeth when they are placed side by side in a row. The teeth are held together in a straight line and supported by means of flexible cables 12 and 13, preferably of wire, and fitting snugly within said holes 9 and 10 in the saw-tooth and, being flexible, permits the saw to conform to the rounded surface of a pulley or drum. The teeth are strung on the cables with their abutting edges pressed closely together and are prevented from separating by the outer teeth of the series, which are rigidly secured to the cable by filling the holes in said teeth around the cables with solder or by locking said outer teeth by clamps, rivets, or in any suitable way. If it is desired to use the saw in an endless belt, it is necessary to secure the ends of the cables together, and we therefore provide one of said teeth with a recess 14, wherein the ends of the cables meet and are secured together by filling said recess with solder.

Our improved saw is cheap to manufacture, as the teeth are stamped out from sheet metal very quickly, and the drilling of the same and passing the cables through the holes therein makes but little additional expense. The teeth being separable and independent can be readily removed when broken without any expensive fitting or adjustment.

While we have shown our improved saw in connection with a device corresponding substantially to a cable-saw mill, we have particularly designed it for use in cutting down trees where a particular construction of machine would be provided either having wheels or pulleys, substantially as shown in Figs. 1 and 2, or suitable drums, as may seem best adapted for the purpose.

Obviously various modifications may be made in the form of teeth used, the manner of securing them in position upon the cables, and the means for securing the ends of the cables together, and we therefore do not wish to be confined to the details herein shown and described.

Having thus described our invention, we claim as new and desire to secure by Letters Patent—

1. As a new article of manufacture, a saw, comprising a series of flat separable teeth of substantially the same thickness throughout, and means included by the thickness of said teeth and between the same for securing them together.

2. As a new article of manufacture, a saw, comprising a series of flat separable teeth, their shanks having straight edges and said teeth being of substantially the same thickness throughout, each tooth having its edges in engagement with the abutting edges of the adjoining teeth, and independent means included by the thickness of said teeth and between the same for securing them together.

3. As a new article of manufacture, a saw having a series of separable teeth, their shanks having straight parallel edges and said teeth being of substantially the same thickness throughout, the edges of each tooth being in engagement with the edges of the abutting teeth but not connected thereto, and flexible means included by the thickness of said teeth and between the same for supporting or securing them together, substantially as described.

4. A saw comprising a series of teeth, having holes or openings extending through the same from edge to edge, the diameter of said holes being less than the thickness of said teeth between their cutting edges, flexible cables passing through said holes or openings, means securing the outer teeth of the series in position upon said cables, and means for securing the ends of said cables together, substantially as described.

5. The combination, with a series of flat teeth provided with straight-edged shanks having parallel holes or openings extending through the same from edge to edge, the holes in each tooth registering with corresponding holes in the abutting teeth, cables passing through said holes, means to prevent the slipping of said teeth upon said cable, and means for securing the ends of said cables together, substantially as described.

6. The combination, with a series of teeth having holes or openings extending through the same from edge to edge, cables passing through said holes or openings, means preventing the slipping of said teeth upon said cables, one of said teeth having a recess or depression wherein the ends of said cables meet, and means for securing said ends together, substantially as described.

In witness whereof we have hereunto set our hands this 3d day of August 1899.

JOHN E. LUCE.
FREDERICK D. SEARS.

In presence of—
A. C. PAUL,
A. F. HOLMES.